United States Patent
Coutinho et al.

(10) Patent No.: US 10,588,001 B2
(45) Date of Patent: Mar. 10, 2020

(54) SYSTEMS AND METHODS FOR A NODE SUPPORTING NETWORK CODED MESH NETWORKING IN A NETWORK OF MOVING THINGS

(71) Applicant: Veniam, Inc., Mountain View, CA (US)

(72) Inventors: Nuno Alexandre Tavares Coutinho, Oporto (PT); João Francisco Cordeiro de Oliveria Barros, Mountain View, CA (US)

(73) Assignee: VENIAM, INC., Mountain View, CA (US)

( * ) Notice: Subject to any disclaimer, the term of this patent is extended or adjusted under 35 U.S.C. 154(b) by 0 days.

(21) Appl. No.: 15/708,400

(22) Filed: Sep. 19, 2017

(65) Prior Publication Data

US 2018/0007502 A1   Jan. 4, 2018

Related U.S. Application Data

(63) Continuation of application No. 15/372,345, filed on Dec. 7, 2016, now Pat. No. 9,769,599, which is a continuation of application No. 15/354,638, filed on Nov. 17, 2016, now abandoned.

(60) Provisional application No. 62/257,854, filed on Nov. 20, 2015.

(51) Int. Cl.
| | |
|---|---|
| H04W 4/80 | (2018.01) |
| H04L 29/08 | (2006.01) |
| H04L 1/18 | (2006.01) |
| H04L 1/00 | (2006.01) |
| H04L 29/06 | (2006.01) |
| H04W 4/06 | (2009.01) |

(52) U.S. Cl.
CPC ............ *H04W 4/80* (2018.02); *H04L 1/0076* (2013.01); *H04L 1/1819* (2013.01); *H04L 67/108* (2013.01); *H04L 67/1097* (2013.01); *H04L 69/22* (2013.01); *H04W 4/06* (2013.01)

(58) Field of Classification Search
None
See application file for complete search history.

(56) References Cited

U.S. PATENT DOCUMENTS

| | | | |
|---|---|---|---|
| 7,827,458 B1 | 11/2010 | Salsbury et al. | |
| 2006/0262789 A1 | 11/2006 | Peleg et al. | |
| 2007/0153679 A1 | 7/2007 | Jost et al. | |
| 2008/0320104 A1* | 12/2008 | Turner | H04L 65/607 709/219 |
| 2009/0003216 A1 | 1/2009 | Radunovic et al. | |
| 2010/0046371 A1* | 2/2010 | Sundararajan | H04L 1/004 370/235 |

(Continued)

OTHER PUBLICATIONS

Int'l Search Report and Written Opinion for PCT/US2016/062687 dated Jan. 31, 2017 (10 pages).

(Continued)

*Primary Examiner* — Kodzovi Acolatse
(74) *Attorney, Agent, or Firm* — McAndrews, Held & Malloy, Ltd.

(57) ABSTRACT

Communication network architectures, systems, and methods supporting network coding of packet data in a network of moving things. Through the use of network coding, a network of moving things provides redundancy and improved network capacity and reliability.

33 Claims, 10 Drawing Sheets

(56) References Cited

U.S. PATENT DOCUMENTS

| | | |
|---|---|---|
| 2010/0188967 A1 | 7/2010 | Michaelis et al. |
| 2011/0044180 A1* | 2/2011 | Kim .................... H04L 1/0026 |
| | | 370/242 |
| 2012/0188934 A1 | 7/2012 | Liu et al. |
| 2014/0269289 A1 | 9/2014 | Effros et al. |
| 2014/0269505 A1* | 9/2014 | Medard .................. H04W 4/06 |
| | | 370/328 |
| 2014/0281837 A1* | 9/2014 | Frigo ................... H04L 1/0041 |
| | | 714/776 |
| 2014/0369253 A1* | 12/2014 | Jose .................. H04W 28/065 |
| | | 370/315 |
| 2015/0281406 A1* | 10/2015 | Lucani ................. H04L 1/0057 |
| | | 370/477 |
| 2016/0359770 A1* | 12/2016 | Heide ..................... H04L 1/004 |
| 2019/0090174 A1 | 3/2019 | Rocci et al. |

OTHER PUBLICATIONS

"Random Linear Network Coding: A free cipher?", authors Luisa Lima, Muriel Medard, Joao Barros Retrieved from < http://www.rle.mit.edu/ncrc/wp-content/uploads/2014/02/2007_random.pdf> on Nov. 16, 2016.

"A Random Linear Network Coding Approach to Multicast", Tracey Ho, Muriel Medard, Ralf Koetter, David R. Karger, Michelle Effros, Jun Shi, and Ben Leong, IEEE Transactions on Information Theory, vol. 52, No. 10, Oct. 2006. Retrieved from < http://www.its.caltech.edu/~tho/itrandom-final.pdf> on Nov. 16, 2016.

"Network Coding: An Instant Primer LCA-Report-2005-010", Christina Fragouli, Jean-Yves Le Boudec and Jorg Widmer.

Supplementary European Search Report for EP16867193, dated Apr. 16, 2019, 11 pages.

* cited by examiner

SYSTEMS AND METHODS FOR A NODE SUPPORTING NETWORK CODED MESH NETWORKING IN A NETWORK OF MOVING THINGS

CROSS-REFERENCE TO RELATED APPLICATIONS/INCORPORATION BY REFERENCE

This patent application is a continuation of U.S. patent application Ser. No. 15/372,345, filed Dec. 7, 2016, now U.S. Pat. No. 9,769,599, which is a continuation of U.S. patent application Ser. No. 15/354,638, filed Nov. 17, 2016, titled "Systems and Methods for Network Coded Mesh Networking in a Network of Moving Things," which makes reference to, claims priority to, and claims benefit from U.S. Provisional Patent Application Ser. No. 62/257,854, filed on Nov. 20, 2015, and titled "Systems and Methods for Network Coded Mesh Networking in a Network of Moving Things," each of which is hereby incorporated herein by reference in its respective entirety. The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things). Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
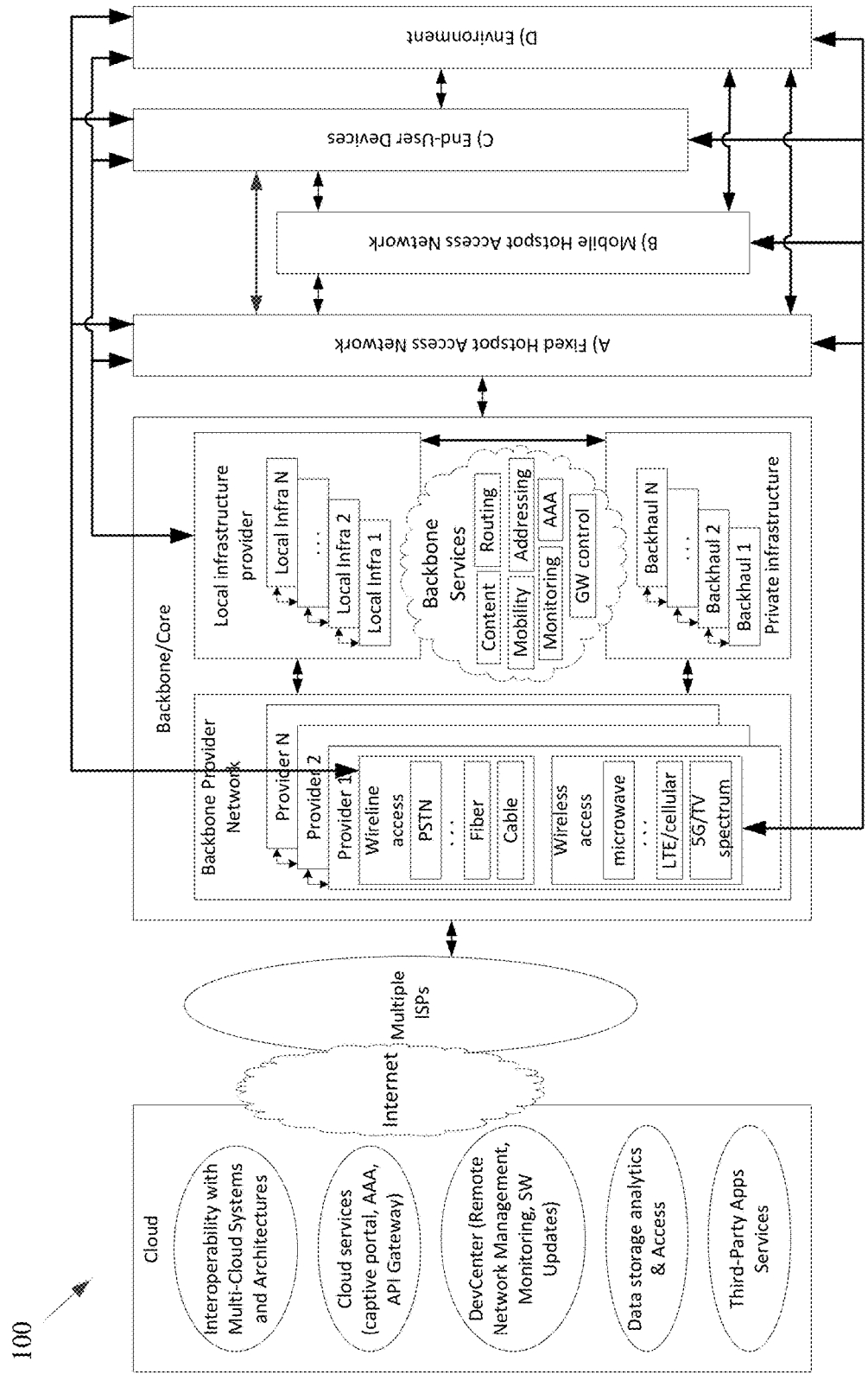
FIG. 1 shows a block diagram of a communication network, in accordance with various aspects of this disclosure.

Various aspects of this disclosure provide communication network architectures, systems and methods for supporting a network of mobile and/or static nodes. As a non-limiting example, various aspects of this disclosure provide communication network architectures, systems, and methods supporting network coding of packet data in a network of moving things. Through the use of network coding, a network of moving things provides redundancy and improved network capacity and reliability.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or x" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles. Such sensors may, for example, comprise positioning sensors (e.g., GPS sensors, Galileo sensors, GLONASS sensors, etc.). Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, trucks' positions and engines' status, and then be able to provide real-time notifications to drivers (e.g., to turn on/off the engine, follow the right route inside the harbor, take a break, etc.), thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example networks and/or network components 200, 300, 400, 500-570, and 600, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
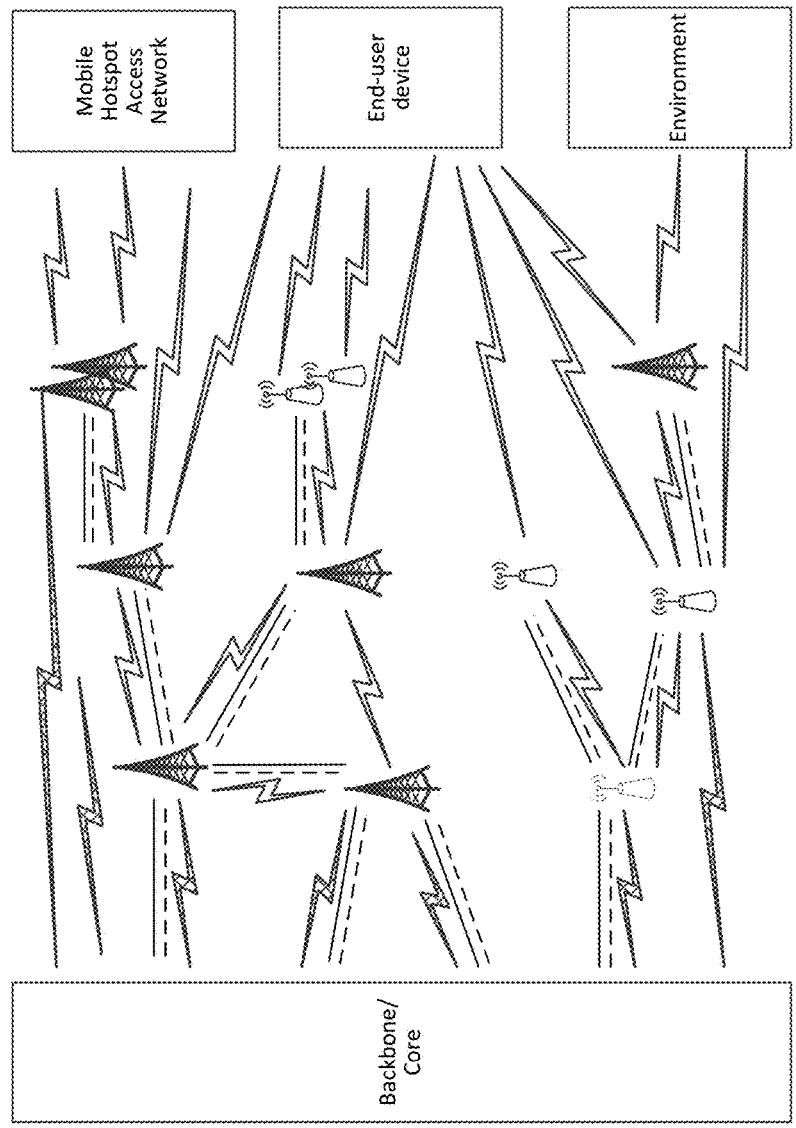
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example networks and/or network components 100, 300, 400, 500-570, and 600, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.)

may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
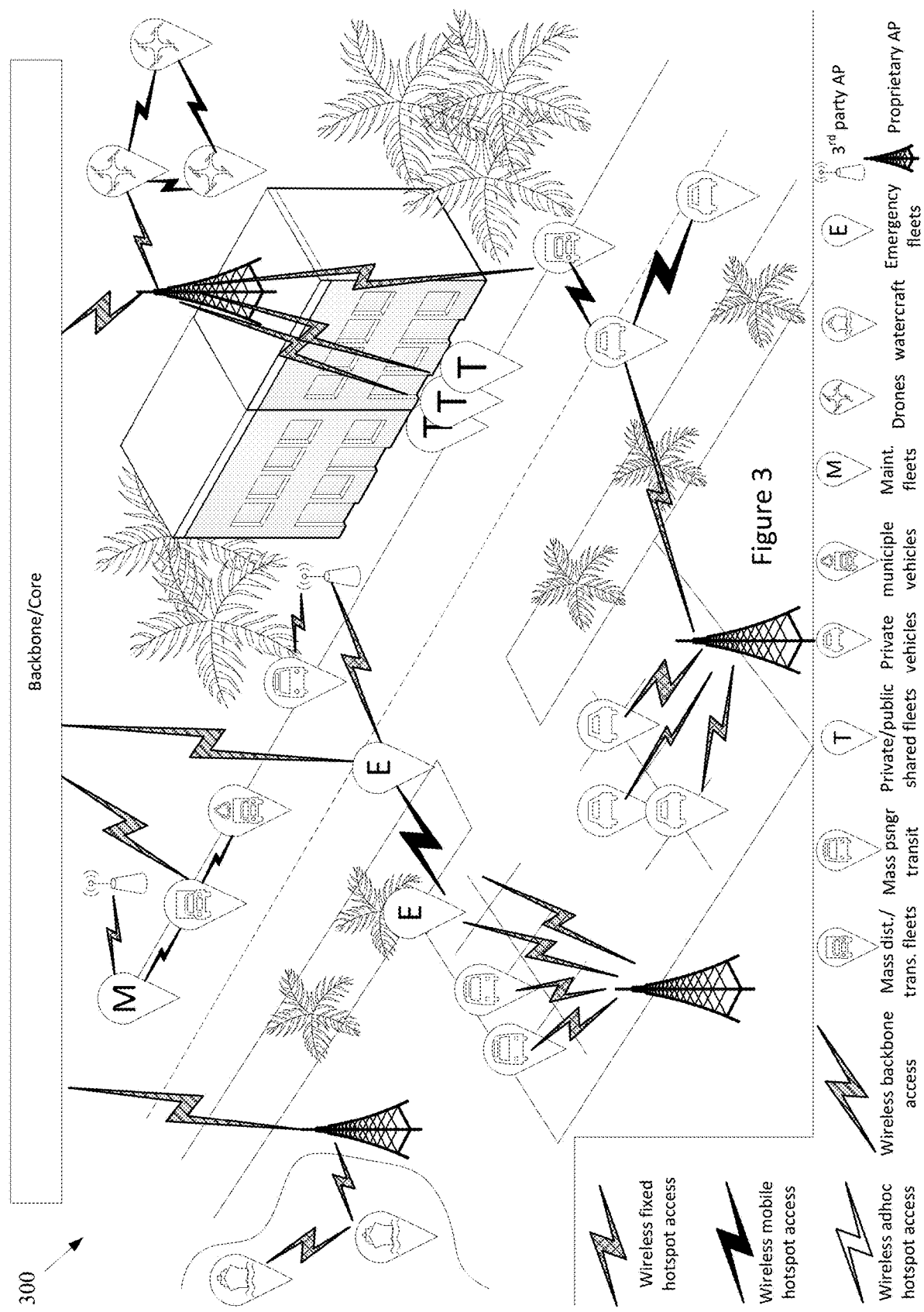
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example networks and/or network components 100, 200, 400, 500-570, and 600 discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
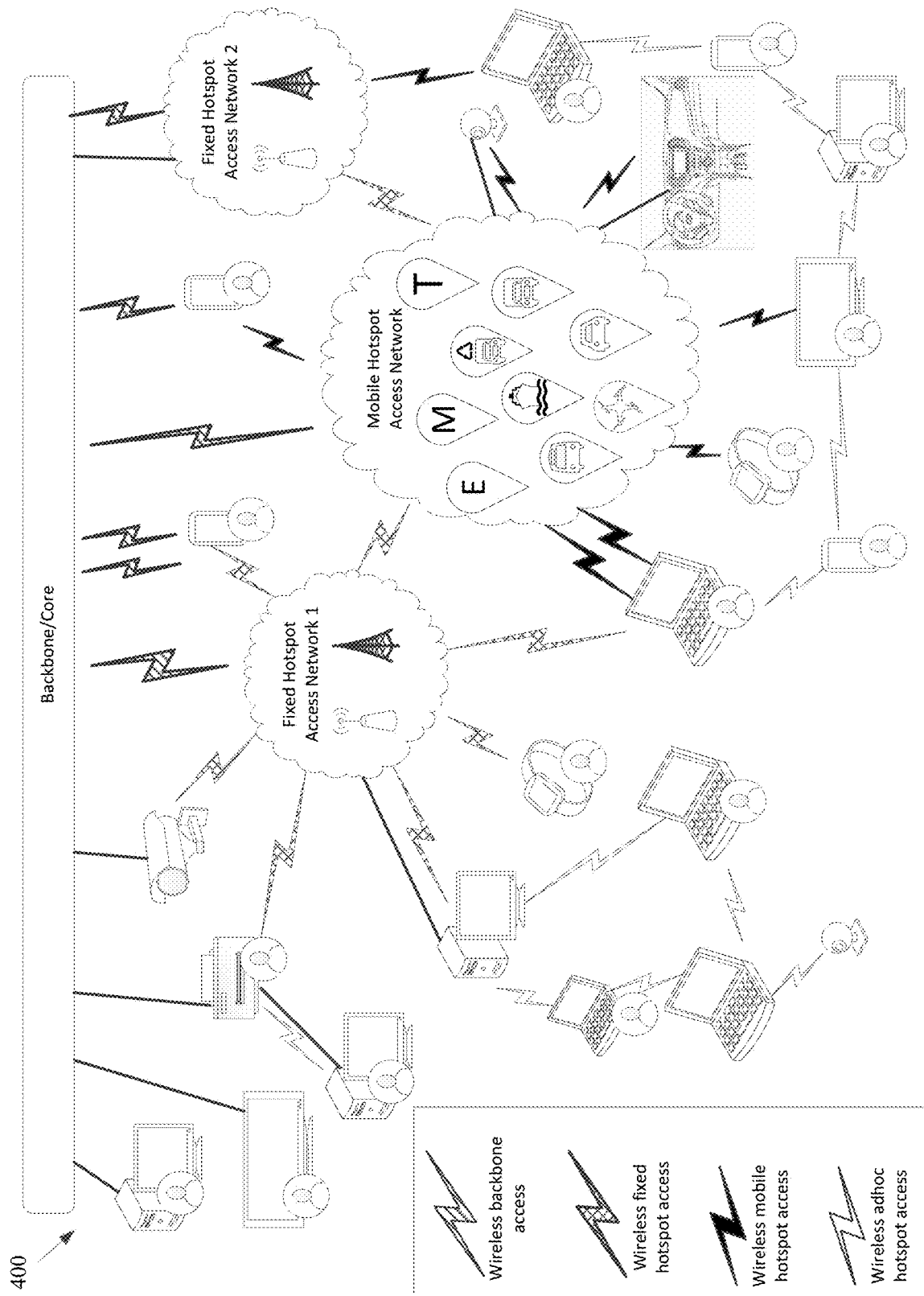
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example networks and/or network components 100, 200, 300, 500-570, and 600, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
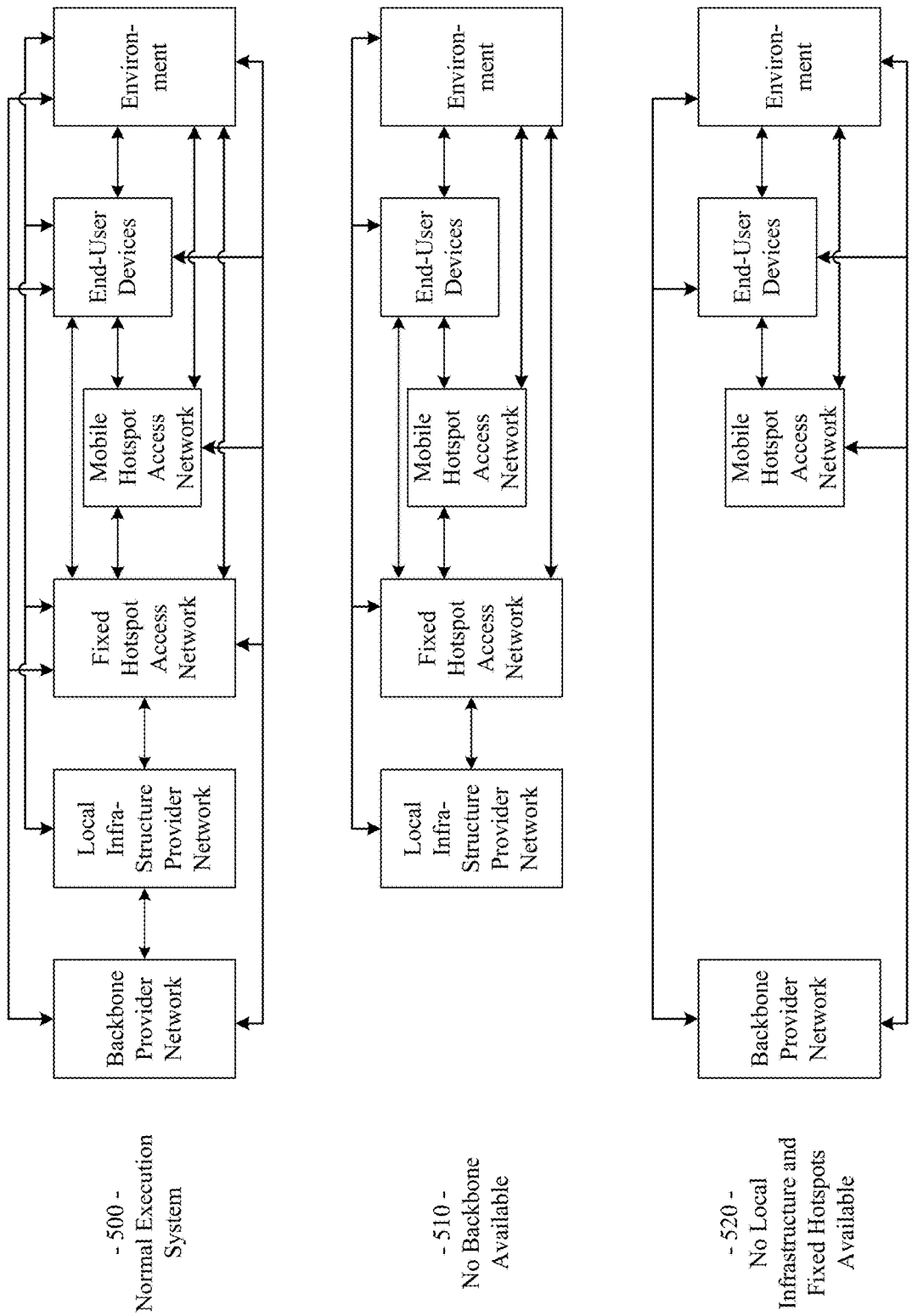
FIGS. 5A-5C show a plurality of network configurations illustrating the flexibility and/or and resiliency of a communication network, in accordance with various aspects of this disclosure.
Figure 5B:
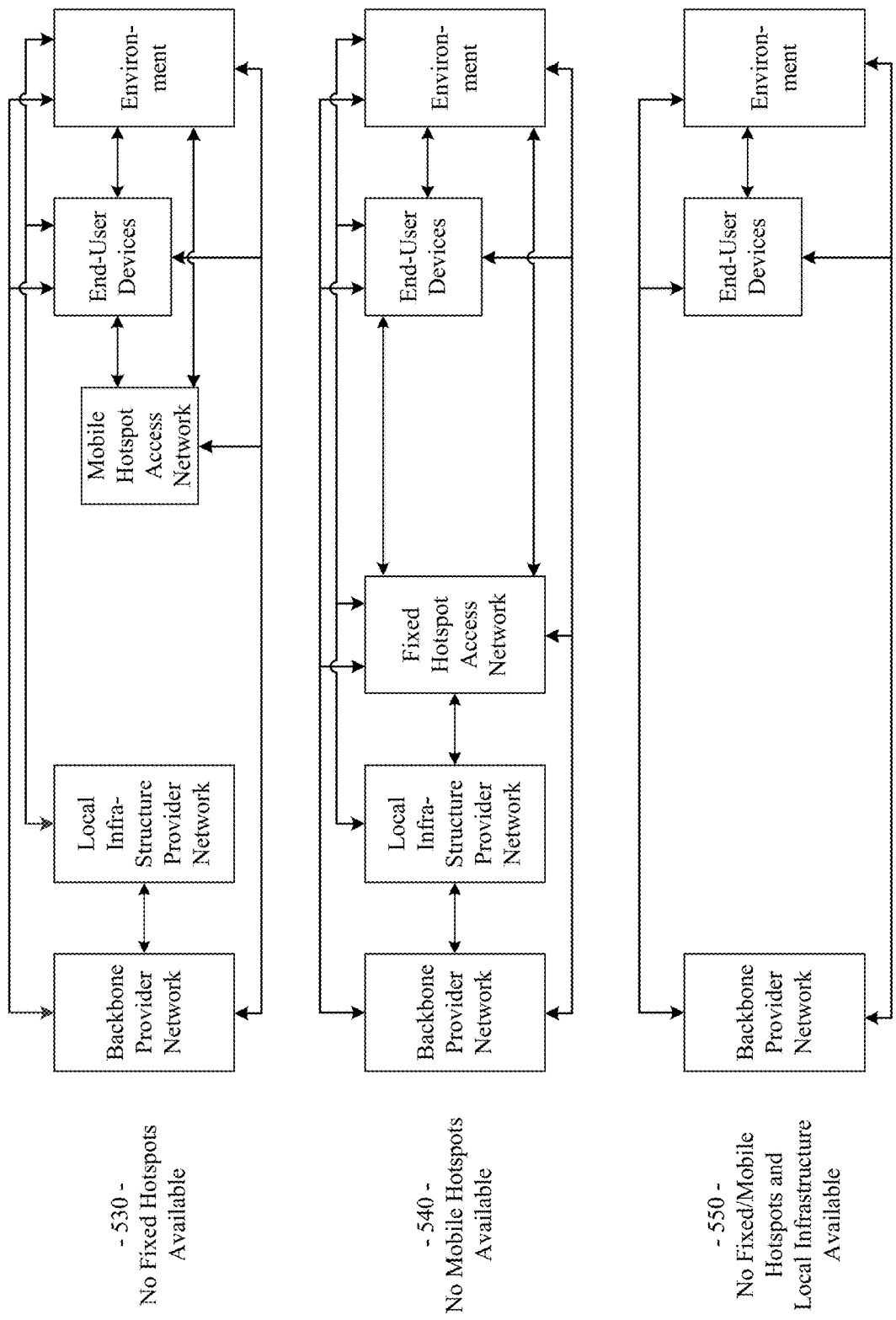
Figure 5C:
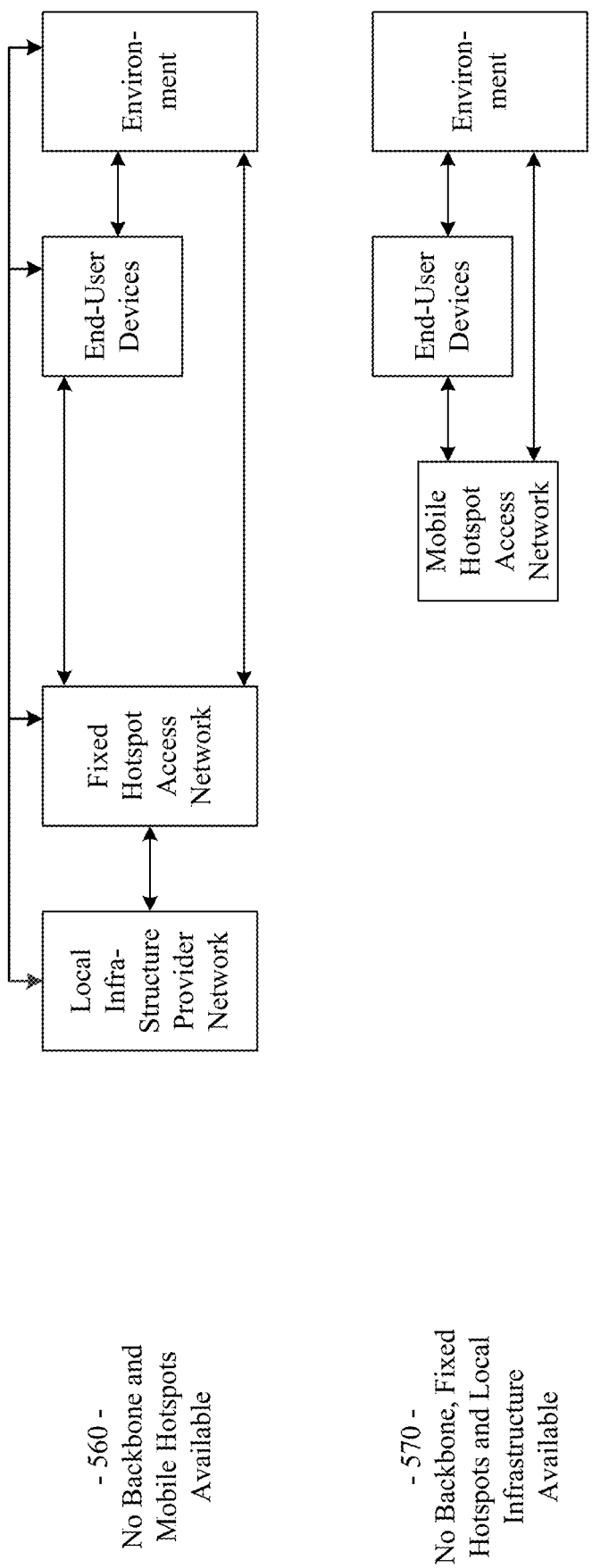

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example networks and/or network components 100, 200, 300, 400, and 600, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
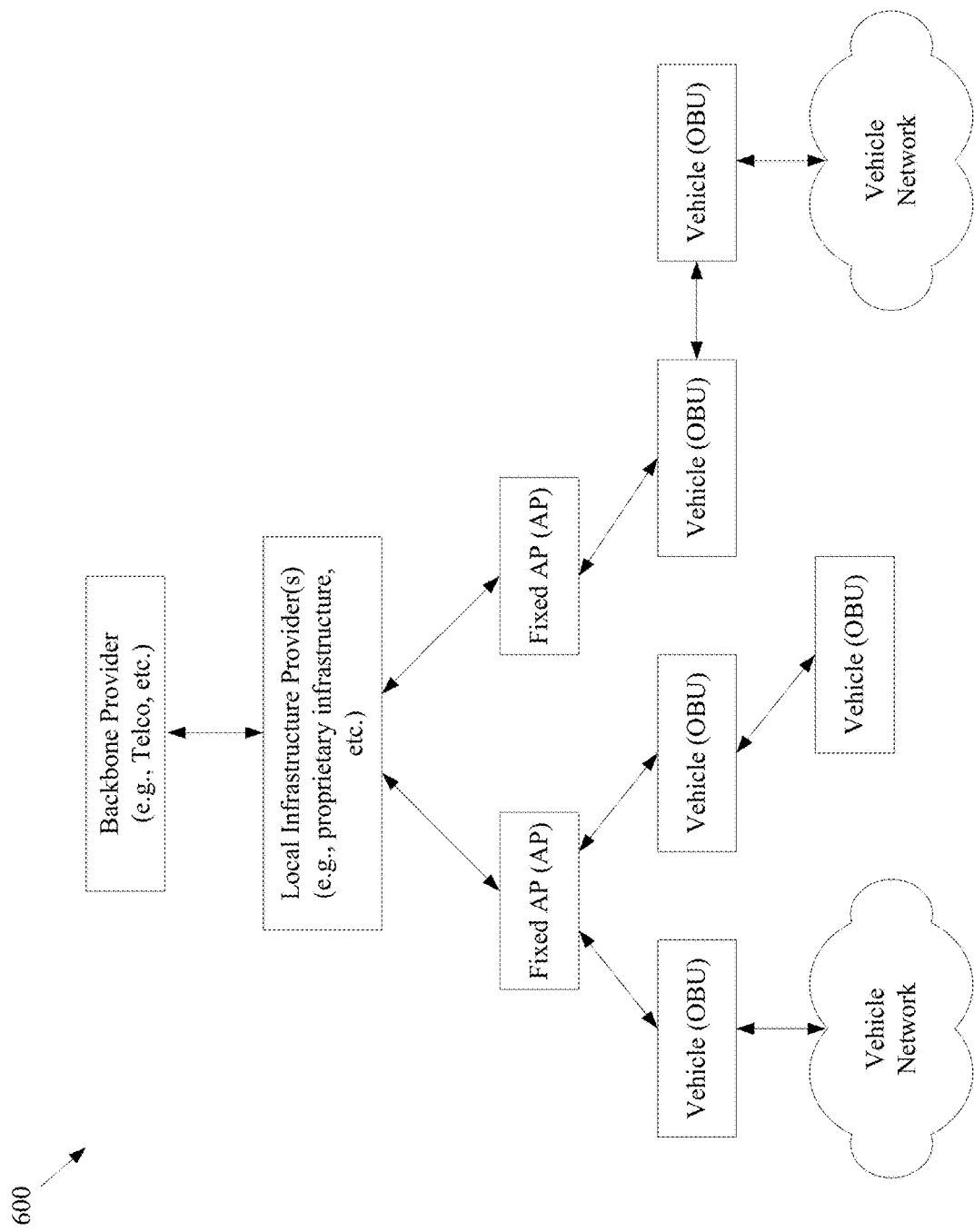
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example networks and/or network components 100, 200, 300, 400, and 500-570, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

In accordance with various aspects of the present disclosure, systems and methods are provided that manage a vehicle communication network, for example in accordance with the location of nodes and end devices, in a way that provides for stable TCP/IP Internet access, among other things. For example, an end user may be provided with a clean and stable Wi-Fi Internet connection that may appear to the end user to be the same as the Wi-Fi Internet connection at the user's home, user's workplace, fixed public Wi-Fi hotspots, etc. For example, for a user utilizing a communication network as described herein, a TCP session may stay active, downloads may process normally, calls may proceed without interruption, etc. As discussed herein, a vehicle communication network in accordance with various aspects of this disclosure may be applied as a transport layer for regular Internet traffic and/or for private network traffic (e.g., extending the access of customer private LANs from the wired network to vehicles and users around them, etc.).

In accordance with an example network implementation, although a user might be always connected to a single Wi-Fi AP of a vehicle, the vehicle (or the access point thereof, for example an OBU) is moving between multiple access points (e.g., Fixed APs, other Mobile APs, cellular base stations, fixed Wi-Fi hotspots, etc.). For example, mobility management implemented in accordance with various aspects of the present disclosure supports the mobility of each vehicle and its users across different communication technologies (e.g., 802.11p, cellular, Wi-Fi, etc.) as the Mobile APs migrate among Fixed APs (and/or Mobile APs) and/or as users migrate between Mobile APs.

In accordance with various aspects of the present disclosure, a mobility controller (MC), which may also be referred to as an LMA or Network Controller, may monitor the location (e.g., network location, etc.) of various nodes (e.g., Mobile APs, etc.) and/or the location of end users connected through them. The mobility controller (MC) may, for example, provide seamless handovers (e.g., maintaining communication session continuity) between different access points and/or different technologies with low link latency and low handover times.

The architecture provided herein is scalable, for example taking advantage of redundant elements and/or functionality to provide load-balancing of control and/or data communication functionality, as well as to decrease failure probability. Various aspects of the present disclosure also provide for decreased control signaling (e.g., in amount and/or frequency), which reduces the control overhead and reduces the size of control tables and tunneling, for example both in backend servers and in APs (e.g., Fixed APs and/or Mobile APs).

Additionally, a communication network (or components thereof) in accordance with various aspects of this disclosure may comprise the ability to interact with mobile devices in order to control some or all of their connection choices and/or to leverage their control functionality. For example, in an example implementation, a mobile application can run in the background, managing the available networks and/or nodes thereof and selecting the one that best fits, and then triggering a handoff to the selected network (or node thereof) before breakdown of the current connection.

The communication network (or components thereof) is also configurable, according to the infrastructure requirements and/or mobility needs of each client, etc. For example, the communication network (or components thereof) may comprise the capability to support different Layer 2 (L2) or Layer 3 (L3) implementations, or combinations thereof, as well as IPv4/IPv6 traffic.

Network Coding is a method or technique of data communication that has the potential to improve network performance, particularly when applied in wireless mesh networks, due to the improved coding opportunities that occur in that type of network. A vehicular network is an example of a mesh network that is particularly challenging due to the occurrence of nodes/vehicles joining and leaving the network frequently, which may lead to very short connectivity times, constantly changing network topology, and unexpected losses of connectivity. Use of network coding in accordance with various aspects of the present disclosure increases the average throughput and reduces the overall delay of communication via vehicular networks when compared to traditional routing. Use of network coding in accordance with various aspects of the present disclosure also adds a level of security to the communication of data via such a network as a result of the mixing of original packet contents within each network node and the use of coding coefficients to decode the received coded information. Use of network coding in accordance with various aspects of the present disclosure also increases robustness of the vehicular network as a result of the use of redundant coded information to mitigate possible data packet losses due to interference and loss of wireless radio frequency communication. Aspects of this disclosure provide systems and methods that overcome many challenges of implementing network coding in a vehicular network, enabling such networks to leverage the potential of network coding. This includes upper layer control mechanisms to coordinate the transmission of coded data packets, to decide when to start coding, to determine which data packets to code, and to determine when to stop coding.

One example application in which the use of network coding in accordance with aspects of the present disclosure introduces great performance improvements is in content distribution. By applying network coding to information in data packets communicated between or among various network nodes such as, for example, fixed access points (APs) and mobile APs, or among the mobile APs themselves, the information content of each data packet is mixed with information content from data packets of other network nodes. By using network coding, it is not necessary to ensure that any particular data packet is delivered to its destination. Instead, methods and systems in accordance with various aspects of the present disclosure may simply ensure that the receiving node has a sufficiently large number of independent data packets to use in combination for network coding of data packets.

Figure 7:
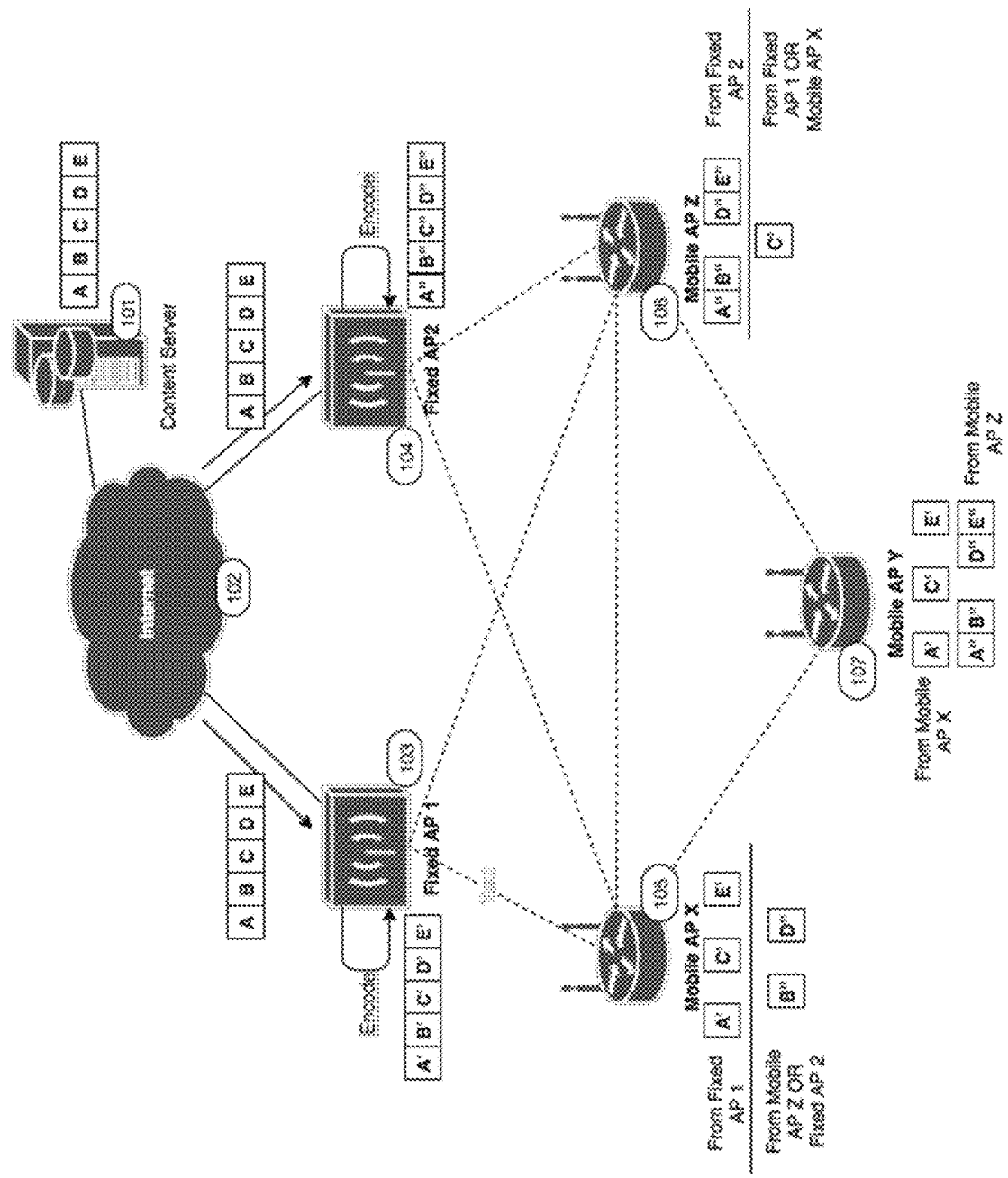
FIG. 7 depicts an example content distribution arrangement of network nodes that illustrates the network coding concept, in accordance with various aspects of the present disclosure.

FIG. 7 depicts an example content distribution arrangement of network nodes that illustrates the network coding concept, in accordance with various aspects of the present disclosure. In the example of FIG. 7, a certain set of information content, fragmented in five different data packets (A,B,C,D,E), is intended to be delivered from a content server 101 to a group of three mobile APs, AP X 105, AP Z 106, and AP Y 107. The information content may be sent by the content server 101 to the Internet 102, and forwarded using, for example, a multicast mechanism, through the Internet 102 to two fixed APs AP 1 103 and AP 2 104. Then, the fixed APs AP 1 103 and AP 2 104 may encode the original information content of the five data packets A, B, C, D, and E using a respective set of coefficients C1'-C25' and C1"-C25," and set of mathematical or logical operations, to produce five coded data packets A', B', C', D', and E' for AP 1 103 and five coded data packets A", B", C", D", and E" for AP 2 104, in a manner such as the example shown and described below:

$$A'=C1'\times A+C2'\times B+C3'\times C+C4'\times D+C5'\times E$$

$$B'=C6'\times A+C7'\times B+C8'\times C+C9'\times D+C10'\times E$$

$$C'=C11'\times A+C12'\times B+C13'\times C+C14'\times D+C15'\times E$$

$$D'=C16'\times A+C17'\times B+C18'\times C+C19'\times D+C20'\times E$$

$$E'=C21'\times A+C22'\times B+C23'\times C+C24'\times D+C25'\times E$$

$$A''=C1''\times A+C2''\times B+C3''\times C+C4''\times D+C5''\times E$$

$$B''=C6''\times A+C7''\times B+C8''\times C+C9''\times D+C10''\times E$$

$$C''=C11''\times A+C12''\times B+C13''\times C+C14''\times D+C15''\times E$$

$$D''=C16''\times A+C17''\times B+C18''\times C+C19''\times D+C20''\times E$$

$$E''=C21''\times A+C22''\times B+C23''\times C+C24''\times D+C25''\times E$$

The information content of the five coded data packets, A', B', C', D', and E' and A", B", C", D", and E" produced, respectively, by the fixed APs AP 1 103 and AP 2 104 may be generated from the information content of original data packets A, B, C, D, and E sent by the content server 101, and a respective set of coefficients C1' through C25' and C1" through C25", in the manner shown above. In accordance with various aspects of the present disclosure, each coefficient C1'-C25' and C1"-C25" may be a sequence of random bits generated by a Pseudo Random Number Generator (PRNG) algorithm. Such a random sequence of bits is reproducible as long as the same seed is used in the PRNG algorithm. Each of the coded packets A', B', C', D', and E', and A", B", C", D", and E" is the result of the illustrated mathematical or logical operations on the contents of an original data packet using the corresponding coefficient from a set of coefficients for the sender (i.e., set of coefficients C1'-C25' for fixed AP 1 103 and set of coefficients C1"-C25" for fixed AP 2 104), where the coefficient corresponds to the original data packet, per the above equations. The multiplication and addition operations in the equations illustrated above may, for example, be performed in what is referred to as a "finite field," which is different from typical arithmetic. These operations depend on the size of the finite field. The finite field may, for example, be of size 2 or 8 (for computation reasons), but theoretically may be of any size. In a finite field of size 2 for instance, the addition operation (+) may be a logical exclusive-OR operation (XOR) between bits, and a multiplication operation (×) may be a logical AND operation. In accordance with aspects of the present disclosure, each of the original data packets A, B, C, D, and E is a packet of information made up of symbols, where each data packet has a certain same number of symbols, and each symbol has a certain same number of bits (e.g., coded in bytes of 8 bits). In a situation in which the number of symbols of data is not an integer multiple of the number of symbols in a packet, a data packet is padded with zeros to fill out the remaining portion of the defined data packet size. In accordance with various aspects of the present disclosure, the number, N, of original data packets used in producing N coded data packets may be adjusted, and may affect coding/decoding efficiency. Use of a larger number of original packets may provide greater throughput, at the possible cost of computational effort/load and transmission delay. In conditions of varying communication link quality or availability, the number of original packets used may be automatically adjusted up or down to increase the likelihood that all network nodes are able to receive enough information/packets to be able to decode the coded data packets, while maximizing network throughput. In accordance with various aspects of the present disclosure, the coded data packets may be communicated using a broadcast communication protocol and medium, so that any of the data packets that are communicated by any network node may be received by any other node of the network. In this way, the use of network coding makes the most of the available resource and communication opportunities. Although some network nodes may receive information that is not needed, the use of network coding in situations in which the same content is to be distributed throughout many or all of the network nodes makes for better use of the available resources (e.g., the shared wireless spectrum). To ensure that the coded data packets generated by the fixed AP 1 103 are linearly independent from the coded data packets generated by, for example, the fixed AP 2 104, or any other network node, each of the fixed APs, AP 1 103 and AP 2 104 may use a different set of coefficients (e.g., example sets C1'-C25' and C1"-C25", respectively). In accordance with various aspects of the present disclosure, each of the nodes of the network (e.g., the fixed APs AP 1 103 and AP 2 104, and/or mobile APs) may randomly generate its own set of coefficients. In order to decode the original information, any node in the network only needs to receive the same number of coded data packets. In accordance with various aspects of the present disclosure, the PRNG seed used to generate the set of coefficients used by the sender is sent with each coded packet and is used to reproduce those same coefficients at the receiver, which may then be used to decode the N coded packets to reproduce the N original data packets. In the case of the example described with regard to the illustration of FIG. 7, that number of data packets is five, although the number of packets used is not a specific limitation of the present disclosure. The power of network coding used in the manner described herein is that any coded packet X' includes information from all of the N original packets used in the coding. The same is true for a coded packet X". Benefits of network coding are realized when a network node receives both coded packet X' and coded packet X", which both contribute valuable information for the decoding process. If a network node receives the same code packet twice, e.g., X', the decoding process may not be able to be completed, because there may not be enough linearly independent rows in the decoding matrix (i.e., two or more rows contain the same information).

In the example illustrated in FIG. 7, the mobile AP X 105 receives the coded data packets A', C', and E' while, for example, passing near the fixed AP 1 103, but for some reason, does not receive coded packets B' and D' (i.e., coded packets B' and D' were possibly lost as a result of, for example, short connectivity period, or low signal strength/poor signal quality of the signal(s) communicated between the mobile AP X 105 and the fixed AP 1 103). Also as illustrated in FIG. 7, the mobile AP Z 106 receives coded data packets A", B", D", and E" from fixed AP 2 104, but does not receive coded data packet C" (i.e., coded data packet C" is lost as a result of, for example, short connectivity period between the mobile AP Z 106 and the fixed AP 2 104). Without the use of network coding such as that described in the present disclosure, mobile AP Z 106 would need to receive a retransmission of the exact coded data packet C" in order to retrieve all the content. However, through the use of network coding in accordance with aspects of the present disclosure, mobile AP Z 106 only needs to receive any of coded packets A', B', C', D', or E' from the mobile AP X 105 or the fixed AP 1 103 to be able to decode all of the original content of data packets A, B, C, D, and E. The same applies to the mobile AP X 105, which only needs to receive any two of A", B", C", D", E", B', and D' from the mobile AP Z 106, fixed AP 2 104, and/or mobile AP Y 107 to be able to decode the content of all of the original content of data packets A, B, C, D, and E.

In a similar way, we may now consider a situation where a mobile AP Y 107 is only within the range of the mobile AP X 105 and mobile AP Z 106, and is not within communication range of either of the fixed AP 1 103 or the fixed AP 2 104 of FIG. 7. In such a situation, the mobile AP Y 107 may, for example, retrieve all of the content of the original data packets A, B, C, D, and E using the coded data packets available from the mobile AP X 105, if mobile AP X 105 already has all the content. The mobile AP Y 107 may also, for example, retrieve all of the content of the original data packets using the coded data packets available from the mobile AP Z 106, if mobile AP Z 106 already has all the content. In addition, the mobile AP Y 107 may, for example, retrieve all of the content of the original data packets using a sufficient number of coded data packets received together from the mobile AP X 105 and the mobile AP Z 106.

In such a dynamic communication environment such as may exist in the case of vehicular networks, the use of network coding as described herein help to overcome the potentially short connectivity times and information inconsistency that is experienced, without unacceptable overhead. In addition, fallback mechanisms may be employed in cases in which a particular network node is unable to receive all the coded content. For example, in accordance with various aspects of the present disclosure, a feedback report may be sent by a particular network element (e.g., a network node that has received insufficient coded data packets to enable the network node to decode the coded data packets back into the information content of the original data packets) to one or more network nodes (e.g., fixed APs or mobile APs) after a certain period of time (e.g., a "timeout"), to trigger retransmission of missing content, so that all network nodes have an opportunity to obtain all of the content. The infrastructure of a network of moving things in accordance with various aspects of the present disclosure may measure network performance based on measurements from the elements of the network such as, for example, Mobile APs, Fixed APs and Network Controllers. Such a network may then, for example, use a Cloud-based system/resource to monitor the performance of the network, and may react to network performance changes by, for example, setting a shorter timeout period after a network node begins receiving coded packets. The communication of that setting of a particular timeout period may be made by the Cloud-based system/resource directly with the respective network elements. A network coding solution applied to a network of moving things as disclosed herein may be consistent across all of the network nodes. Thus, the number of original packets coded together, N, may be pre-defined according to a compromise between resources and efficiency, in order to maximize network performance. In this way, a particular network node, after receiving the first coded packet from a set of N coded packets, may count down the set timeout period until the particular network node determines that the particular network node has not received sufficient information from received coded packets to enable the particular network node to decode the original information. The particular network node may then, for example, communicate that determination (i.e., of the failure of the particular network node to be able to decode a set of N coded packets) to, for example, the Cloud-based system/resource, to permit the Cloud-based system/resource to determine whether an adjustment of the timeout period to be used is warranted.

Figure 8:
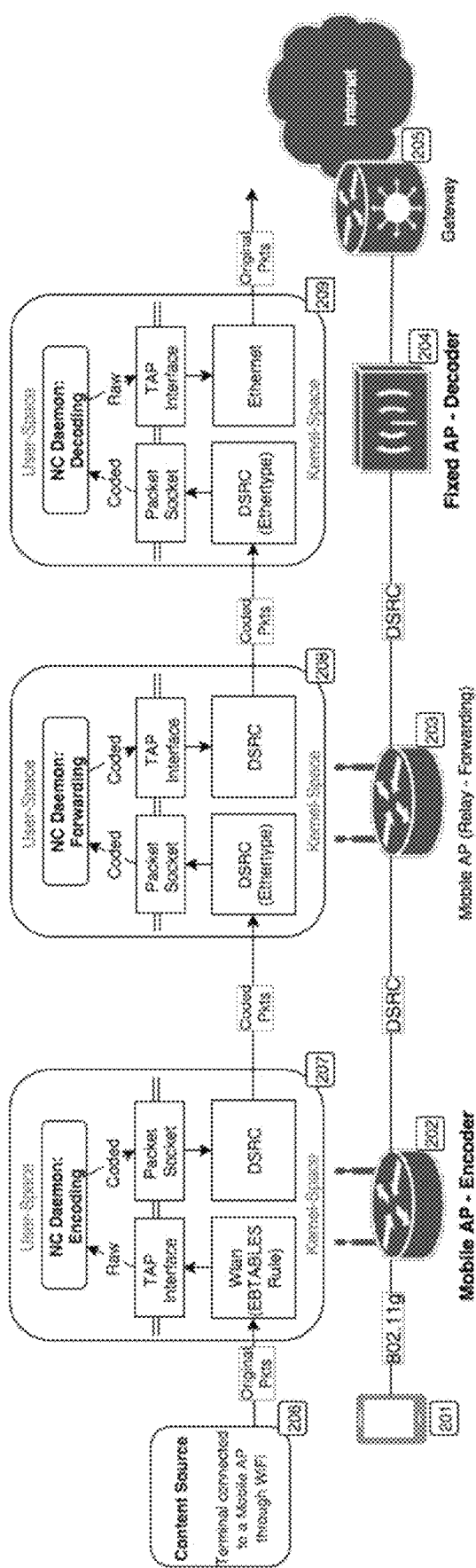
FIG. 8 illustrates example devices configured for performing network coding in a network of moving things, in accordance with various aspects of the present disclosure.

FIG. 8 illustrates example devices configured for performing network coding in a network of moving things, in accordance with various aspects of the present disclosure. In the example of FIG. 8, information content may be generated by an Internet of Moving Things client device 201 (e.g., a smartphone, personal computer, or other suitable device) and transported to the Internet using, for example, a wireless mesh vehicular network such as that described above with reference to FIGS. 1-7. While communication of information content from the client device 201 to gateway 205 is described in the present discussion, it should be noted that the reverse process (i.e., the communication of information content from the gateway 205 to the client device 201) operates in a similar manner. The network coding operations referred to herein may, for example, be performed at "layer-2" (i.e., the "data link layer" of the OSI Reference Model) of each network node, the same layer where routing is typically performed. Such coding may occur whenever the network node is connected through a communication interface that supports, for example, a protocol such as the Dedicated Short Range Communication (DSRC) layer-2 protocol, which supports wireless communication that is broadcast in nature, and where network nodes may opportunistically receive (e.g., "sniff") coded data packets being transmitted by network nodes within wireless communication range.

As shown in the network example of FIG. 8, a network node such as, for example, the mobile AP 202 may receive data packets from a network node such as, for example, the client device 201 (acting as a content source 206) via, for example, a Wi-Fi (e.g., IEEE 802.11a/b/g/n/ac/af) wireless interface. The raw layer-2 packets received by the mobile AP 202 may then be intercepted and redirected, by system software, to network coding software, circuitry and/or logic resident on the mobile AP 202. In accordance with various aspects of the present disclosure, an example implementation using a Linux networking stack may, for example, employ a "rule" that operates at layer 2 (i.e., the data link layer) to cause redirection of the raw layer-2 packets to what is referred to herein as a "TAP" interface or device, illustrated in FIG. 8 as Element 207. A TAP interface/device is a virtual network kernel device that is supported entirely by software that permits access to raw network traffic (e.g., Ethernet/IP layer-2 frames/packets) from user-space applications. TAP devices are available in many Linux-type operating systems, and the internal details of their operation is beyond the scope of present application and will not be discussed further here. The act of redirection may be performed using, for example, an "ebtables" rule, which may also be adapted to filter traffic of a certain type, to differentiate the frames/packets that contain information content that is to be coded from the frames/packets that are not to be coded. Through use of such a TAP interface, a background process referred to herein as a "daemon" may read one or more entire layer-2 frames/packets using the same type of software identifier (e.g., a "file descriptor") typically used to access storage and communication resources. As part of this activity, the network coding software, circuitry and/or logic may collect some information from the frame/packet headers (e.g., IP destination address) to be used later in forming the coded frames/packets.

Once an uncoded frame/packet is captured by the Mobile AP 202, the codification process starts by sending the raw data including, for example, the IP header information, the transport header information (e.g., information related to UDP/TCP) and any payload data to the network coding software, circuitry and/or logic of the mobile AP 202 (e.g., the daemon process running on the hardware of the mobile AP 202). The network coding software, circuitry and/or logic responsible for the coding operations captures frame/packet traffic to be coded from the TAP (virtual) interface, as described above, and incoming coded frame/packet traffic may, for example, be captured on a packet socket, which may use a particular value of a parameter or information element/field of each packet (e.g., "EtherType") to distinguish coded and uncoded packets. Depending on the destination of the coded frames/packet(s), which may be determined based on, for example, a network coding header that the network coding software, circuitry and/or logic may add after the MAC header and before the payload, each frame/packet may either be queued for decoding (e.g., if the destination is the local network node) or forwarded to its final destination.

In accordance with various aspects of the present disclosure, the network coding software, circuitry, and/or logic may perform multiple functions concurrently, to enable the network coding software, circuitry, and/or logic to deal with a large amount of throughput of coded and uncoded content. In an example implementation, the network coding software, circuitry, and/or logic may comprise a multi-threaded daemon running on one or more processing cores and/or may comprise a plurality of hardware modules performing respective tasks concurrently and/or in parallel with each other. For example, network coding may be implemented at the user-space level, leveraging the processing capability (e.g., a CPU having one or more cores) and operating system (OS) (e.g., Linux/UNIX) networking tools of the network nodes (e.g., mobile AP or fixed AP) by running a daemon with encoding and decoding capabilities implemented using a high-level programming language such as, for example, the C programming language. In such an implementation, network coding capabilities in accordance with various aspects of the present disclosure may be added to an existing network node (e.g., mobile AP or fixed AP devices running the OpenWrt operating system.) through a simple software upgrade of existing network elements/devices. In other example implementations, the network coding may be implemented in dedicated hardware (e.g., an application specific integrated circuit (ASIC), field programmable gate array (FPGA), etc.). In such an implementation, parallel hardware blocks may, for example, correspond to the daemon threads described in the example implementation discussed below.

In an example implementation, the functions performed by the network coding functionality of a particular network node include what is referred to herein as a "bucket function," a "coding function," and a "decoding function." In accordance with various aspects of the present disclosure, the "bucket function" may comprise collecting incoming frames/packets for further processing and immediately forwarding all traffic that is not to be encoded by the particular network node. Traffic that is not to be encoded by the particular network node may include, for example, traffic that is already encoded and not intended for the particular network node, and/or traffic of a particular service for which network coding is not used. In an example implementation, the same software, circuitry and/or logic (e.g., hardware module or same processing thread running on one or more processing cores) may be used for collecting both coded and uncoded frames/packets.

A "coding function" in accordance with various aspects of the present disclosure may comprise producing and transmitting coded frames/packets when enough uncoded frames/packets are available. Software, circuitry and/or logic configured to implement the coding function may be activated (e.g., a hardware module powered up and/or a processing thread spawned) by circuitry implementing the bucket function, and may remain idle for some time before terminating or powering down to avoid the processing and delay overhead caused by frequent creation/power-up and termination/power-down. As described hereinabove in greater detail, the primary actions of the coding function include, for example, buffering the information content (e.g., payload) of N packets, generating N random coefficients, dividing the information content of the N packet into symbols, and apply the coding equations. The information included in the coded packets to aid the decoding process includes, for example, an index of the coded packet within the N coded packets, and the seed used with the PRNG to generate the coefficients used for coding, which is to be employed by the decoder PRNG in regenerating the set of coefficients to be used for decoding.

A "decoding function" in accordance with various aspects of the present disclosure may be similar to the "coding function" discussed above, and may produce and transmit decoded frames/packets. Software, circuitry, and/or logic configured to implement the decoding function may be activated (e.g., a hardware module powered up and/or a thread spawned) by circuitry implementing the "bucket function," and may remain idle for some time before terminating or powering down to avoid the processing and delay overhead caused by frequent creation/power-up and termination/power-down. The process of decoding the received coded packets is more complex than the coding process described herein, and may employ known network coding algorithms such as, for example, those for Random Linear Network Coding (RLNC). As described herein, the information used to decode the coded packets includes, for example, the seed used to generate the coefficients employed in coding the content of the N original packets. The decoding process knows that it has sufficient information, when the decoding process determines that the decoding matrix has enough linearly independent rows to be invertible (rank N).

In accordance with various aspects of the present disclosure, the network coding software, circuitry, and/or logic of a network node (e.g., that of a mobile AP or fixed AP) may be integrated with other applications running on one or more cores of a processor of the network node by listening to what is referred to herein as a "system-wide ubus," so that the network node is able to receive information from what is referred to herein as a "connection manager." Additional information about a "system-wide ubus" may be found, for example, in U.S. patent application Ser. No. 15/277,549, titled "Systems and Methods for Inter-Application Communication in a Network of Moving Things", filed on Sep. 27, 2016, and in U.S. patent application Ser. No. 15/203,294, titled "Systems and Methods for Managing Connectivity in a Network of Moving Things", filed on Jul. 6, 2016, the complete contents of each of which is hereby incorporated herein, in its respective entirety. In this manner, the network coding software, circuitry, and/or logic of a network node is able to halt coding if, for example, traffic is being routed through an external network (e.g., a cellular provider network) not participating in the network coding. In accordance with various aspects of the present disclosure, a network of moving things as described herein may, for example, automatically enable (turn on) and disable (turn off) the use of network coding, based on whether network nodes (e.g., Mobile APs) are using cellular communication technology, which does not normally make use of a broadcast wireless communication environment, or are instead using a vehicle-to-vehicle (V2V) or vehicle-to-infrastructure (V2I) wireless communication technology (e.g., IEEE 802.11p (DSRC)), which permits leveraging the throughput of broadcast network coded V2V or V2I communications. That is, in situations in which communication is between a first network node (e.g., a Mobile AP) and a second entity (e.g., a server in the Cloud), using a wireless cellular network, the "connection manager" of a Mobile AP in accordance with various aspects of the present disclosure may disable the coding procedures, and may at another time enable the coding procedures when the wireless medium in use is a broadcast medium. In addition, a network in accordance with aspects of the present disclosure may automatically enable/disable network coding when network nodes (e.g., Mobile APs) are in specific geographic regions. Even if network coding is not employed in all portions of a route of a vehicle, the coding process may be activated by network nodes (e.g., Mobile APs) in known scenarios in which a high density of network nodes are present to permit the use of network coding to improve the overall network throughput. Further, a network in accordance with aspects of the present disclosure may, at times, disable network coding capabilities to decrease the computational costs, when the network node does not have neighbors nearby with which it can communicate using a broadcast communication technology. The benefits network coding/decoding result from operating in scenarios with a high density of network nodes that are able to exchange coded information among one another. Whenever a given network node is in situations in which there is a low density of network nodes, decoding opportunities may be reduced, and there may be a large delay in retrieving the original content or, ultimately, not being able to decode. A network of moving things according to the present disclosure may, for example, employ both sender (i.e., encoder)-based or receiver (i.e., decoder)-based strategies. In using a sender-based strategy, the sender may monitor how many packets were acknowledge by the receiver, so that the sender may then decrease the rate of sending coded packets to that specific network node. In using a receiver-based strategy, the network may, for example, use a feedback-based approach in which a receiving network node notifies the sending network node when decoding is completed on information that was previously sent, signaling that new encoded data can then be sent. Another example strategy permits the receiver to specifically request information (e.g., particular coded packets) that enable the decoding process (e.g., that provide sufficient linearly independent rows in the decoding matrix to enable decoding), instead of receiving additional coded packets that do not add value for the decoding process (e.g., receiving additional coded packets that are duplicates of packets already in hand at the receiving network node). In accordance with some aspects of the present disclosure, one or more network nodes (e.g., a Mobile AP) may pass nearby a given sensor in the network and may have in the data memory of the network nodes, coded packets from that sensor that could not be decoded when received. Those network nodes may carry those coded packets in memory until the network nodes arrive at a location of another network node (e.g., a Fixed AP), at which time the as of yet not decoded coded packets may be sent to, for example, a Cloud-based system. The coded packets from the one or more network nodes may then be decoded in the Cloud-based system when a sufficient number and the right mix of coded packets arrive at the Cloud-based system, independently of the order of arrival of the coded packets, to permit the Cloud-based system to decode the coded packets. In addition, a network according to some aspects of the present disclosure may decrease the level of redundancy used in the coding/decoding process, when the density of network nodes (e.g., vehicles with Mobile APs, Fixed APs) is above a certain threshold. In situations in which the density of network nodes is relatively higher, coding opportunities are also higher. Therefore, network nodes (e.g., Mobile APs) may automatically detect a level of density of neighboring network nodes (e.g., by monitoring wireless transmissions) and may, in response, decrease the level of redundancy employed when coding packets for transmission to or through those neighboring network nodes. This example approach eases the coding and decoding processes, by avoiding the extra overhead (e.g., computational load upon the network nodes) of producing and decoding additional coded packets.

In accordance with various aspects of the present disclosure, the network coding software, circuitry, and/or logic may be operable to inject raw layer-2 frames/packets directly to the network interface without further changes. For example, a daemon process/thread implementing network coding functions may send the coded data packet to a packet socket that allows direct injection of raw layer-2 frames/packets to the device driver without further changes. In an example implementation, a particular parameter value (e.g., an "EtherType" value of 0xC0DE) introduced in the MAC header may be used to distinguish coded information from the remaining traffic that flows in the network. In this way, it is possible (e.g., using "ebtables" rules on the next hop) to filter coded frames/packets and give them the proper treatment. Moreover, to be able to decode the information of coded frames/packets, the network coding header may contain relevant information to enable the network node performing the decoding to derive the original information content as soon as the network node performing the decoding receives all of the minimum required number of coded packets.

In accordance with various aspects of the present disclosure, as soon as a new coded frame/packet is built (e.g., at mobile AP 202), it is sent on a link (e.g., a DSRC link) of the vehicular network, towards the endpoint or destination node. In the example illustrated in FIG. 8, the destination is shown as the fixed AP 204. In a situation in which an intermediary node exists such as, for example the mobile AP 203 of FIG. 8, the intermediary node may intercept the packets based on a particular value of a packet parameter (e.g., a particular value of their "EtherType") and may inspect them to determine whether they should be decoded or not. In accordance with aspects of the present disclosure, such verification may be made using an identifier located in the network coding headers of the frames/packets. If the intermediary node (e.g., mobile AP 203) determines that a received frame/packet is not to be decoded, the frame/packet is simply forwarded on to the next hop. Each intermediary node forwards the frames/packets to the next hop towards the destination using a suitable routing protocol for a wireless mesh vehicular network. Finally, the endpoint/destination node (i.e., fixed AP 204 in the example shown in FIG. 8) then decodes the frames/packets, and injects them into a backhaul communication path (i.e., the gateway 205 and Internet of FIG. 8).

In accordance with various aspects of the present disclosure, different coding parameters may be used to support the network coding process, which may be highly dynamic, according to information representative of the computation, network, and current application/service context. Such context information may include, for example, a current location of the node performing network coding, the type of traffic the node is handling, and/or the like. There may be particular network applications, times of day, node geographic locations, types of data traffic, etc., where it is not useful for a particular node to use network coding, and there may be other network applications, times of day, node geographic locations, types of data traffic, etc., where the performance of the network will benefit considerably from the use of network coding. For instance, content distribution where the majority of the nodes of the network need to have the same information is an example application where network coding may provide significant performance benefits.

One example parameter that may be a significant consideration in regards to the impact of network coding on network performance is the number of frames/packets that are encoded together. Encoding a larger number of frames/packets together may require more computation resources for encoding and decoding. For example, the number of frames/packets that a source node codes together may be varied dynamically based on a number of connections currently existing between the source node and the other and/or destination nodes, where more connections may correspond to deciding to code a higher number of packets together.

Another example parameter that may be dynamically varied may be the coding symbol size. Coding may comprise, by way of illustration and not limitation, exclusive-or (XOR) operations. The use of bit-level coding operations may be very fast and may require few computational resources, but may lead to insufficient information at the decoder more often than may occur using, for example, a larger level (e.g., byte-level) coding process, which may more reliably provide sufficient information at the decoder at the expense of a higher level of consumption of computation resources. In an example implementation, byte-level coding may provide a sufficient balance. The network coding software, circuitry, and/or logic may dynamically select these and/or other parameters of the network coding process, to achieve a desired balance between processing resources used, delay introduced, reliability achieved, throughput achieved, and/or other factors.

Redundancy can also be applied to coded frames/packets, and depending upon the reliability of the communications network, the number of redundant coded frames/packets may also be adjusted to overcome occasional packets losses. For example, locations within the vehicular network where there have historically been more frames/packet losses may use coding with a higher degree or level of redundancy, to compensate for those frame/packet losses, in comparison to a lower degree or level of coding that may be employed used in locations where historically there have been relatively few frame/packet losses. In accordance with various aspects of the present disclosure, frame/packet losses may be monitored and the amount of redundancy used in any given location in the network may adapt over time based on the results of the monitoring of, for example, frame/packet losses, or other conditions. In accordance with various aspects of the present disclosure, a network element such as, for example, a Cloud-based system, may request or instruct network nodes (e.g., Mobile APs) to dynamically increase the level of redundancy used in the coding process based on, for example, historical information, or on real-time events that are affecting the quality of the communications over the network. Some network nodes (e.g., Mobile APs) may monitor a level of packet loss that the network nodes are observing, and may automatically increase the level of redundancy to overcome unacceptably large losses of packets. Such adjustments in the level of redundancy may be made by other network elements as well, including for example, a Cloud-based system.

Network coding in accordance with various aspects of the present disclosure may be applied to a wide variety of services provided in the Internet of Moving Things. A basic network coding mechanism may be easily integrated with services that are already deployed, and may also be a part of new applications that are built on top of a network coding capability. Novel routing strategies based on network coding according to aspects of this disclosure may be applied to the vehicular wireless mesh network, leveraging the shared medium and relaxing the control mechanisms that are currently employed.

The requirements and characteristics of applications supported by a network in accordance with the present disclosure may play a significant role in the tuning of the operation of network coding techniques. Some applications may benefit little from network coding, while for other applications, network coding may improve network and application performance significantly. In accordance with various aspects of the present disclosure, various network coding parameters included in a network coding header may be applied so that the nodes performing encoding and decoding are fully aware of the coding context of the frames/packets being processed, enabling the network nodes to correctly and optimally encode and decode them. A network of moving things operating in accordance with aspects of the present invention enables use of a service differentiation scheme that employs tunable parameters in the coding/decoding procedure. Based on applications having different data/packet loss, bandwidth, and/or latency requirements, such a network may use a relatively smaller number of coding symbols to avoid relatively larger delays in time sensitive applications, or the opposite in delay tolerant information. Such a network may also apply a relatively higher level redundancy of coded packets when network performance is below a particular performance threshold or expectation.

Aspects of the present disclosure may be found in a method of receiving digital information from a content source via a network of moving things comprising at least first network node, a second network node, and a third network nodes. Such a method may comprise receiving, by the third network node via a first communication path, a first subset of packets from a first set of N encoded packets, the first set of N encoded packets encoded by the first network node using a first set of encoding parameters and N corresponding packets containing the digital information. The method may also comprise receiving, by the third network node via a second communication path, a second subset of packets from a second set of N encoded packets, the second set of N encoded packets encoded by the second network node using a second set of encoding parameters and the N corresponding packets. The method may further comprise determining that sufficient encoded packets have been received, by the third network node, if the sum of a first number of packets in the first subset and a second number of packets in the second subset is equal to N, and that every packet in the first subset and the second subset corresponds uniquely to a packet in the N corresponding packets. In addition, the method may comprise decoding the packets in the first subset and the second subset to reproduce the N corresponding packets at the third network node and transmitting the N corresponding packets, by the third network node, to an end-user device, if it is determined that sufficient encoded packets have been received to enable decoding; and waiting for additional packets of the first set of N encoded packets or the second set of N encoded packets to be received, if it is determined that sufficient encoded packets have not been received to enable decoding.

In accordance with various aspects of the present disclosure, communication via the first communication path and the second communication path may share common wireless radio frequency spectrum using a broadcast communication technology, and the broadcast communication technology may be Direct Short Range Communication (DSRC). Waiting for additional packets of the first set of N encoded packets or the second set of N encoded packets to be received may comprise broadcasting one or more messages to other nodes of the network to solicit transmission of packets from the first set of N encoded packets or the second set of N encoded packets. Each packet of the first set of N encoded packets may be encoded and each packet of the second set of N encoded packets may be encoded using information from every packet of the N corresponding packets containing the digital information. The first set of encoding parameters may comprise a coefficient corresponding to each of the N corresponding packets for each of the first set of N encoded packets, and the second set of encoding parameters may comprise a coefficient corresponding to each packet of the N corresponding packets for each of the second set of N encoded packets. Each encoded packet of the first set of N encoded packets and the second set of N encoded packets may be produced by mathematically combining the N corresponding packets according to N coefficients from the respective set of encoding parameters.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide communication network architectures, systems and methods for supporting a network of mobile nodes, for example comprising a combination of mobile and stationary nodes. As a non-limiting example, various aspects of this disclosure provide communication network architectures, systems, and methods for supporting a dynamically configurable communication network comprising a complex array of both static and moving communication nodes (e.g., the Internet of moving things). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A method of communicating digital information of a content source via a network of moving things comprising at least a first node and a second node of a plurality of nodes of the network and a resource shared by the plurality of nodes, the method comprising:
   receiving, by the first node from the resource, a parameter N representing a number of packets and a parameter T representing a period of time;
   randomly generating a set of $N^2$ coefficient values based on an initial seed value;
   buffering, by the first node to form a set of N un-encoded packets, digital information received from the content source, wherein each of the un-encoded packets comprises a certain number of symbols of the content source;
   encoding, by the first node, a set of N encoded packets, wherein each encoded packet corresponds to a respective un-encoded packet of the set of un-encoded packets and each encoded packet is created using the set of un-encoded packets and a corresponding sub-set of N coefficient values from the set of coefficient values; and
   sending the set of encoded packets and the seed value to at least the second node, using a broadcast communication technology on a communication path shared by the plurality of nodes;
   wherein the resource sends an adjusted parameter T to the plurality of nodes, based on receipt of feedback from the second node regarding an inability of the second node to decode the N encoded packets into the corresponding N un-encoded packets within the period of time of parameter T.

2. The method according to claim 1, wherein the method further comprises:
   adjusting the value of parameter N based on one or both of changes in quality and changes in availability of the communication path shared by the plurality of nodes.

3. The method according to claim 1, wherein each coefficient value of the set of coefficient values comprises a respective pseudo-random number from a sequence of $N^2$ pseudo-random numbers generated by a pseudo-random number generator initialized using the seed value.

4. The method according to claim 1, wherein the resource shared by the plurality of nodes is a cloud-based system.

5. The method according to claim 1, wherein the broadcast communication technology comprises a Dedicated Short Range Communication (DSRC) wireless communication protocol.

6. The method according to claim 1, wherein the method further comprises:
   retransmitting the set of N encoded packets and the seed value, by the first node to at least the second node using the broadcast communication technology on the communication path shared by the plurality of nodes, upon receipt by the first node of feedback regarding receipt by the second node of insufficient encoded packets to produce corresponding un-encoded packets within the period of time represented by parameter T.

7. A non-transitory computer-readable medium on which is stored a plurality of code sections, each code section comprising a plurality of instructions executable by one or more processors, the instructions causing the one or more processors to perform the actions of a method of communicating digital information of a content source via a network of moving things comprising at least a first node and a second node of a plurality of nodes of the network and a resource shared by the plurality of nodes, the method comprising:

receiving, by the first node from the resource, a parameter N representing a number of packets and a parameter T representing a period of time;

randomly generating a set of $N^2$ coefficient values based on an initial seed value;

buffering, by the first node to form a set of N un-encoded packets, digital information received from the content source, wherein each of the un-encoded packets comprises a certain number of symbols of the content source;

encoding, by the first node, a set of N encoded packets, wherein each encoded packet corresponds to a respective un-encoded packet of the set of un-encoded packets and each encoded packet is created using the set of un-encoded packets and a corresponding sub-set of N coefficient values from the set of coefficient values; and sending the set of encoded packets and the seed value to at least the second node, using a broadcast communication technology on a communication path shared by the plurality of nodes;

wherein the resource sends an adjusted parameter T to the plurality of nodes, based on receipt of feedback from the second node regarding an inability of the second node to decode the N encoded packets into the corresponding N un-encoded packets within the period of time of parameter T.

8. The non-transitory computer-readable medium according to claim 7, wherein the method further comprises:

adjusting the value of parameter N based on one or both of changes in quality and changes in availability of the communication path shared by the plurality of nodes.

9. The non-transitory computer-readable medium according to claim 7, wherein each coefficient value of the set of coefficient values comprises a respective pseudo-random number from a sequence of $N^2$ pseudo-random numbers generated by a pseudo-random number generator initialized using the seed value.

10. The non-transitory computer-readable medium according to claim 7, wherein the resource shared by the plurality of nodes is a cloud-based system.

11. The non-transitory computer-readable medium according to claim 7, wherein the broadcast communication technology comprises a Dedicated Short Range Communication (DSRC) wireless communication protocol.

12. The non-transitory computer-readable medium according to claim 7, wherein the method further comprises:

retransmitting the set of N encoded packets and the seed value, by the first node to at least the second node using the broadcast communication technology on the communication path shared by the plurality of nodes, upon receipt by the first node of feedback regarding receipt by the second node of insufficient encoded packets to produce corresponding un-encoded packets within the period of time represented by parameter T.

13. A system for communicating digital information of a content source via a network of moving things comprising at least a first node and a second node of a plurality of nodes of the network and a resource shared by the plurality of nodes, the system comprising:

one or more processors operably coupled to storage and at least one wireless communication interface configured to communicate with other nodes of the plurality of nodes, the one or more processors operable to, at least:

receive, by the first node from the resource, a parameter N representing a number of packets and a parameter T representing a period of time;

randomly generate a set of $N^2$ coefficient values based on an initial seed value;

buffer, by the first node to form a set of N un-encoded packets, digital information received from the content source, wherein each of the un-encoded packets comprises a certain number of symbols of the content source;

encode, by the first node, a set of N encoded packets, wherein each encoded packet corresponds to a respective un-encoded packet of the set of un-encoded packets and each encoded packet is created using the set of un-encoded packets and a corresponding sub-set of N coefficient values from the set of coefficient values; and send the set of encoded packets and the seed value to at least the second node, using a broadcast communication technology on a communication path shared by the plurality of nodes;

wherein the resource sends an adjusted parameter T to the plurality of nodes, based on receipt of feedback from the second node regarding an inability of the second node to decode the N encoded packets into the corresponding N un-encoded packets within the period of time of parameter T.

14. The system according to claim 13, wherein the one or more processors are further operable to:

adjust the value of parameter N based on one or both of changes in quality and changes in availability of the communication path shared by the plurality of nodes.

15. The system according to claim 13, wherein each coefficient value of the set of coefficient values comprises a respective pseudo-random number from a sequence of $N^2$ pseudo-random numbers generated by a pseudo-random number generator initialized using the seed value.

16. The system according to claim 13, wherein the resource shared by the plurality of nodes is a cloud-based system.

17. The system according to claim 13, wherein the broadcast communication technology comprises a Dedicated Short Range Communication (DSRC) wireless communication protocol.

18. The system according to claim 13, wherein the one or more processors are further operable to:

retransmit the set of N encoded packets and the seed value, by the first node to at least the second node using the broadcast communication technology on the communication path shared by the plurality of nodes, upon receipt by the first node of feedback regarding receipt by the second node of insufficient encoded packets to produce corresponding un-encoded packets within the period of time represented by parameter T.

19. A method of communicating digital information of a content source via a network of moving things comprising at least a first node and a second node of a plurality of nodes of the network and a resource shared by the plurality of nodes, the method comprising:

receiving, by the first node from the resource, a parameter N representing a number of packets and a parameter T representing a period of time;

randomly generating a set of $N^2$ coefficient values based on an initial seed value;

buffering, by the first node to form a set of N un-encoded packets, digital information received from the content source, wherein each of the un-encoded packets comprises a certain number of symbols of the content source;

encoding, by the first node, a set of N encoded packets, wherein each encoded packet corresponds to a respective un-encoded packet of the set of un-encoded packets and each encoded packet is created using the set of un-encoded packets and a corresponding sub-set of N coefficient values from the set of coefficient values;

sending the set of encoded packets and the seed value to at least the second node, using a broadcast communication technology on a communication path shared by the plurality of nodes; and retransmitting the set of N encoded packets and the seed value, by the first node to at least the second node using the broadcast communication technology on the communication path shared by the plurality of nodes, upon receipt by the first node of feedback regarding receipt by the second node of insufficient encoded packets to produce corresponding un-encoded packets within the period of time represented by parameter T.

20. The method according to claim 19, wherein the method further comprises:
adjusting the value of parameter N based on one or both of changes in quality and changes in availability of the communication path shared by the plurality of nodes.

21. The method according to claim 19, wherein each coefficient value of the set of coefficient values comprises a respective pseudo-random number from a sequence of $N^2$ pseudo-random numbers generated by a pseudo-random number generator initialized using the seed value.

22. The method according to claim 19, wherein the resource shared by the plurality of nodes is a cloud-based system.

23. The method according to claim 19, wherein the broadcast communication technology comprises a Dedicated Short Range Communication (DSRC) wireless communication protocol.

24. A non-transitory computer-readable medium on which is stored a plurality of code sections, each code section comprising a plurality of instructions executable by one or more processors, the instructions causing the one or more processors to perform the actions of a method of communicating digital information of a content source via a network of moving things comprising at least a first node and a second node of a plurality of nodes of the network and a resource shared by the plurality of nodes, the method comprising:

receiving, by the first node from the resource, a parameter N representing a number of packets and a parameter T representing a period of time;

randomly generating a set of $N^2$ coefficient values based on an initial seed value;

buffering, by the first node to form a set of N un-encoded packets, digital information received from the content source, wherein each of the un-encoded packets comprises a certain number of symbols of the content source;

encoding, by the first node, a set of N encoded packets, wherein each encoded packet corresponds to a respective un-encoded packet of the set of un-encoded packets and each encoded packet is created using the set of un-encoded packets and a corresponding sub-set of N coefficient values from the set of coefficient values;

sending the set of encoded packets and the seed value to at least the second node, using a broadcast communication technology on a communication path shared by the plurality of nodes; and retransmitting the set of N encoded packets and the seed value, by the first node to at least the second node using the broadcast communication technology on the communication path shared by the plurality of nodes, upon receipt by the first node of feedback regarding receipt by the second node of insufficient encoded packets to produce corresponding un-encoded packets within the period of time represented by parameter T.

25. The non-transitory computer-readable medium according to claim 24, wherein the method further comprises:
adjusting the value of parameter N based on one or both of changes in quality and changes in availability of the communication path shared by the plurality of nodes.

26. The non-transitory computer-readable medium according to claim 24, wherein each coefficient value of the set of coefficient values comprises a respective pseudo-random number from a sequence of $N^2$ pseudo-random numbers generated by a pseudo-random number generator initialized using the seed value.

27. The non-transitory computer-readable medium according to claim 24, wherein the resource shared by the plurality of nodes is a cloud-based system.

28. The non-transitory computer-readable medium according to claim 24, wherein the broadcast communication technology comprises a Dedicated Short Range Communication (DSRC) wireless communication protocol.

29. A system for communicating digital information of a content source via a network of moving things comprising at least a first node and a second node of a plurality of nodes of the network and a resource shared by the plurality of nodes, the system comprising:

one or more processors operably coupled to storage and at least one wireless communication interface configured to communicate with other nodes of the plurality of nodes, the one or more processors operable to, at least:

receive, by the first node from the resource, a parameter N representing a number of packets and a parameter T representing a period of time;

randomly generate a set of $N^2$ coefficient values based on an initial seed value;

buffer, by the first node to form a set of N un-encoded packets, digital information received from the content source, wherein each of the un-encoded packets comprises a certain number of symbols of the content source;

encode, by the first node, a set of N encoded packets, wherein each encoded packet corresponds to a respective un-encoded packet of the set of un-encoded packets and each encoded packet is created using the set of un-encoded packets and a corresponding sub-set of N coefficient values from the set of coefficient values;

send the set of encoded packets and the seed value to at least the second node, using a broadcast communication technology on a communication path shared by the plurality of nodes; and retransmit the set of N encoded packets and the seed value, by the first node to at least the second node using the broadcast communication technology on the communication path shared by the plurality of nodes, upon receipt by the first node of feedback regarding receipt by the second node of insufficient encoded packets to produce corresponding un-encoded packets within the period of time represented by parameter T.

30. The system according to claim 29, wherein the one or more processors are further operable to:

adjust the value of parameter N based on one or both of changes in quality and changes in availability of the communication path shared by the plurality of nodes.

31. The system according to claim 29, wherein each coefficient value of the set of coefficient values comprises a respective pseudo-random number from a sequence of $N^2$ pseudo-random numbers generated by a pseudo-random number generator initialized using the seed value.

32. The system according to claim 29, wherein the resource shared by the plurality of nodes is a cloud-based system.

33. The system according to claim 29, wherein the broadcast communication technology comprises a Dedicated Short Range Communication (DSRC) wireless communication protocol.

* * * * *